United States Patent
Keller et al.

(10) Patent No.: US 6,858,813 B1
(45) Date of Patent: Feb. 22, 2005

(54) WELD OVERLAY SYSTEM

(76) Inventors: Howard Derrick Keller, 1 Old Tyler Ct., Greenville, SC (US) 29615; Joseph Riley Prince, 190 Bullman Rd., Roebuck, SC (US) 29376

( * ) Notice: Subject to any disclaimer, the term of this patent is extended or adjusted under 35 U.S.C. 154(b) by 0 days.

(21) Appl. No.: 10/428,346

(22) Filed: May 2, 2003

Related U.S. Application Data

(60) Provisional application No. 60/377,926, filed on May 3, 2002.

(51) Int. Cl.$^7$ ................................................ B23K 9/04
(52) U.S. Cl. .................. 219/61; 219/76.14; 219/130.51
(58) Field of Search ............................... 219/61, 76.14, 219/130.51, 137 PS

(56) References Cited

U.S. PATENT DOCUMENTS

| | | |
|---|---|---|
| 2,299,747 A | 10/1942 | Harter |
| 2,427,350 A | 9/1947 | Carpenter et al. |
| 2,756,311 A | 7/1956 | Persson et al. |
| 2,868,954 A | 1/1959 | Skinner et al. |
| 3,139,511 A | 6/1964 | Kudelko |
| 3,549,857 A | 12/1970 | Needham et al. |
| 3,573,420 A | 4/1971 | Johnson |
| 3,626,138 A | 12/1971 | Hurley |
| 3,770,932 A | 11/1973 | Cotter et al. |
| 3,999,031 A | 12/1976 | Yonezawa et al. |
| 4,000,373 A | 12/1976 | Lula et al. |
| 4,224,360 A | 9/1980 | Ohnishi et al. |
| 4,431,447 A | 2/1984 | Schick |
| 4,609,577 A | 9/1986 | Long |
| 4,624,406 A | 11/1986 | Yasuda et al. |
| 4,948,936 A | 8/1990 | Landry |
| 5,306,358 A | 4/1994 | Lai et al. |
| 5,569,396 A | 10/1996 | Topolski |
| 6,013,890 A | 1/2000 | Hulsizer |
| 6,204,477 B1 | 3/2001 | Lai |
| 6,207,927 B1 * | 3/2001 | Mita et al. ............. 219/130.51 |
| 6,627,839 B1 * | 9/2003 | Luckowski et al. ....... 219/76.14 |

FOREIGN PATENT DOCUMENTS

| | | |
|---|---|---|
| JP | 51-12349 | 4/1976 |
| JP | 55-73479 | 6/1980 |
| JP | 55-84276 | 6/1980 |
| JP | 59-110474 | 6/1984 |
| JP | 60133975 | 7/1985 |

* cited by examiner

Primary Examiner—Clifford C. Shaw
(74) Attorney, Agent, or Firm—Thomas W. Epting; Leatherwood Walker Todd & Mann, P.C.

(57) ABSTRACT

A process for applying a weld overlay to a tube with a single pass of a weld head. An inverter-type alternating current pulsed power source, composed of a primary inverter and a secondary inverter, is used to control the melting rate of welding wire during welding of the overlay to the tube. The primary inverter controls the value of output current, and the second inverter changes the polarity of output current between electrode negative. For a given welding current, the wire melting rate increases significantly as the electrode negative ratio increases, and this makes a relatively high welding speed attainable. Increasing the electrode negative ratio at a fixed, predetermined wire feed rate decreases the weld penetration depth, which correspondingly lowers the dilution rate and results in a smooth and narrow welding bead.

19 Claims, 3 Drawing Sheets

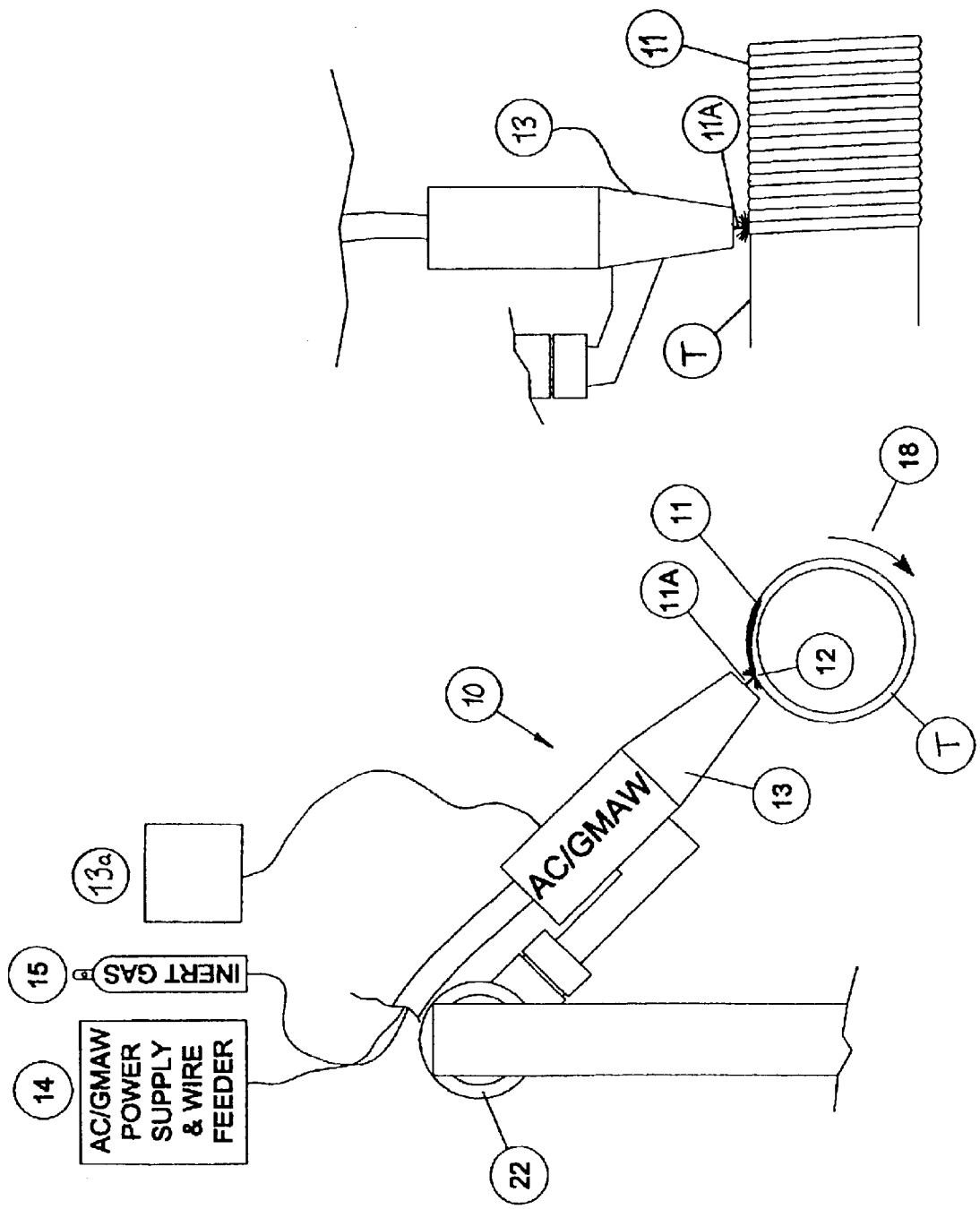

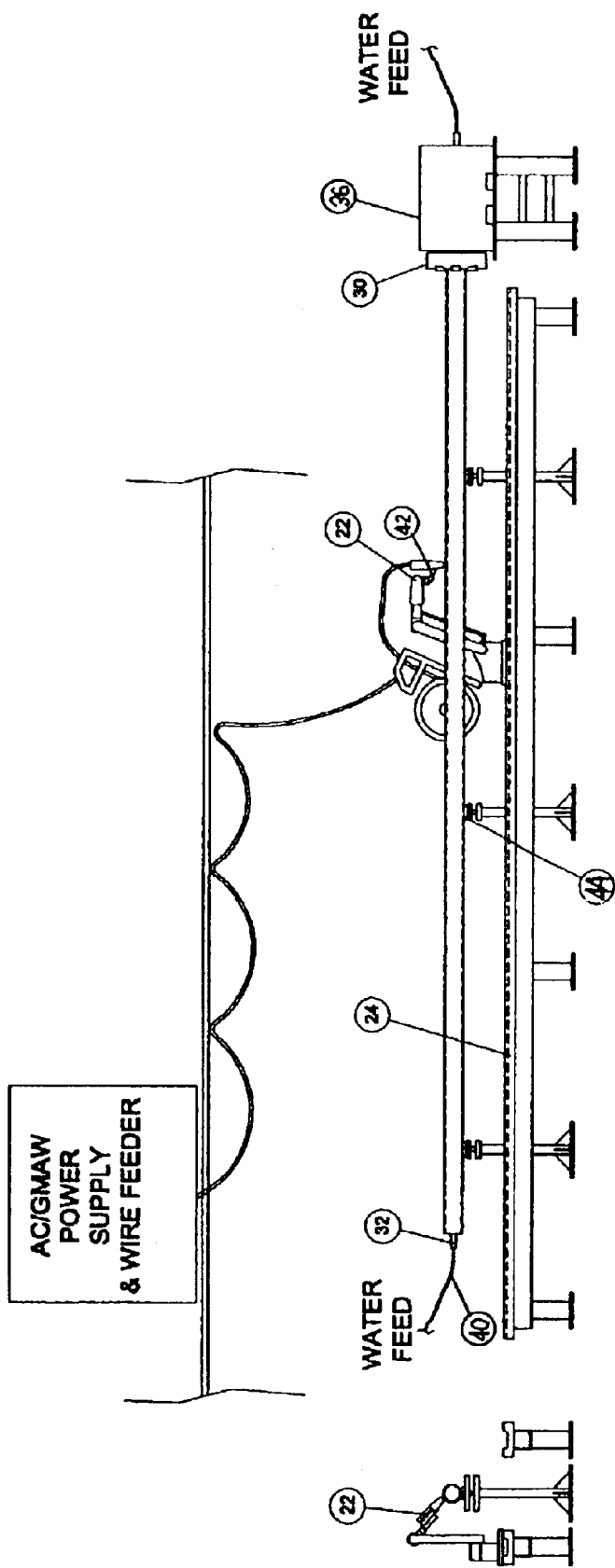
FIGURE: 2

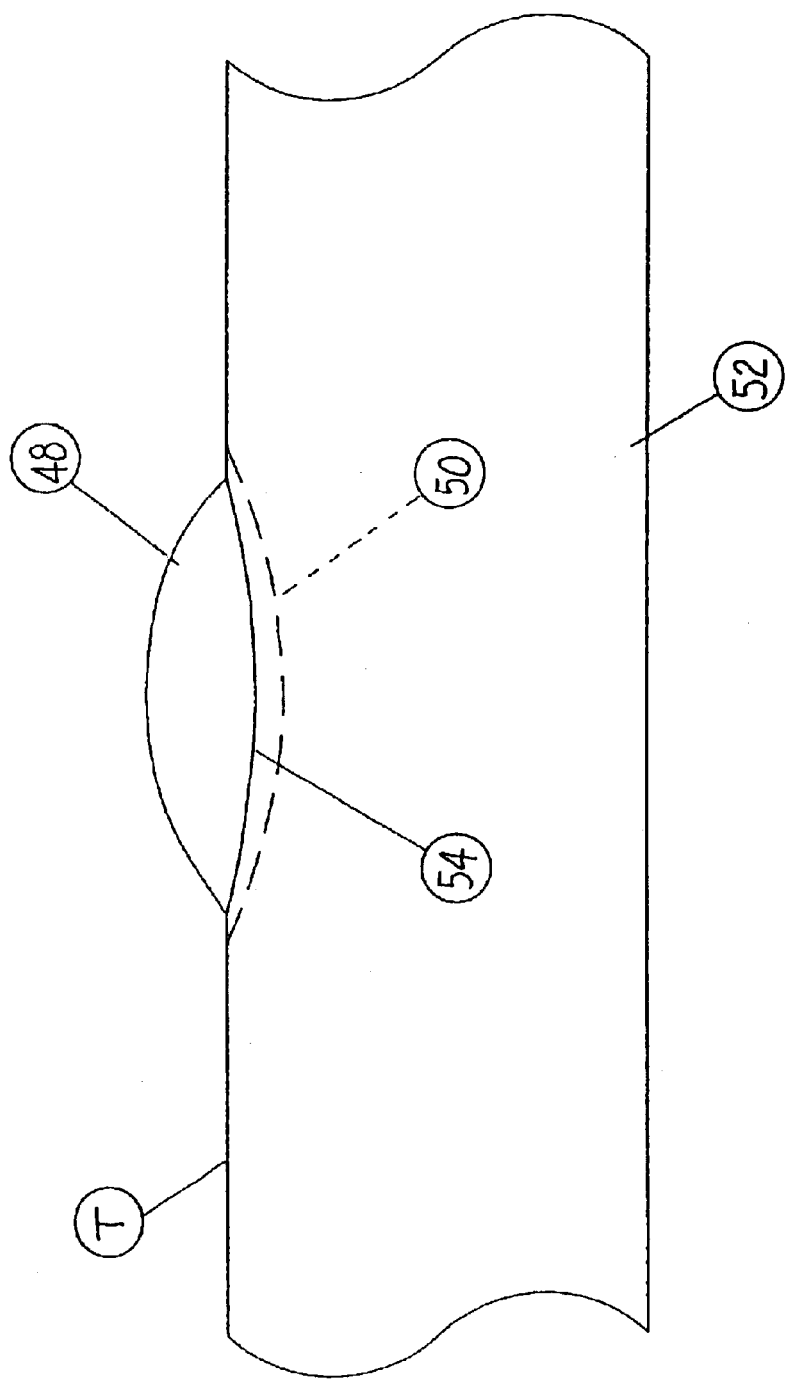
FIGURE: 3

WELD OVERLAY SYSTEM

BACKGROUND OF THE INVENTION

This application claims benefit of U.S. Provisional application Ser. No. 60/377,926, filed May 3, 2002, the entirety of the disclosure of which is incorporated herein by reference thereto.

This application relates generally to a method and equipment for weld overlay of metal tubing. More specifically, the invention relates to a system which employs a welding process to overlay conventional metal tubing in a single pass.

Boilers are used in the power generation, paper, steel, and waste-to-energy industries. These industries have an interest in finding means to protect and extend the operating cycles of their boilers. The operating cycles of the boiler are dependent on the fuel used by the boilers, methods of combustion, impact of environmental regulations, etc.

Boilers generally use tubing for carrying water which is heated to steam in the boiler. Such tubing often has structural requirements and must be corrosion and erosion resistant as well, in view of the high temperature and corrosive conditions within boilers.

In certain types of boilers, such as coal-fired, black liquor recovery, and waste-to-energy boilers, the requirement for corrosion and/or erosion resistance is heightened. In such applications, a solution is often found in applying one or more layers of alloy overlay material to the tubing having the desired corrosion and erosion resistant properties.

When boiler tubing is applied using a weld overlay process, the weld penetration of the tubing needs to be carefully controlled to ensure good fusion between a weld bead of overlay alloy material and tube stock, as well as between adjacent weld beads of the overlay material. The exterior surfaces of the completed weld overlay need to be smooth, and the thickness of the weld overlay needs to be uniform.

Conventional DC gas metal welding processes may produce excessive weld penetration, with what is known as "dilution" of the base metal into the weld metal in excess of 40%, when the weld overlay thickness is less then 0.030 inches thick. Weld overlays with dilution rates of this magnitude are not acceptable.

In the conventional application of weld overlay material, if the voltage and current of the weld head are controlled to ultimately provide a smooth exterior surface on the weld overlays, then weld penetration of the tube stock may tend to be significant and uneven, and this can result in excessive dilution.

On the other hand, if the voltage and current are controlled to provide optimum weld penetration, then the exterior surface of the weld overlay may tend to be rough and uneven. A rough surface finish provides a greater chance for corrosive media to become deposited on the overlay and for localized corrosion sites to form in the overlay. Further, rough exterior overlay surfaces can make the boiler tubes more difficult to bend, by causing an uneven distribution of the stresses to occur in the tubing during bending. Rough and uneven weld overlay surfaces can also affect the thickness and resulting dimensions of the tube.

Certain weld overlay methods have been patented. For example, U.S. Pat. No. 6,013,890, issued to Hulsizer, discloses a dual weld pass overlay method and apparatus which uses a first weld head to apply a bead of weld overlay material onto a tube, and thereby create a heat-affected zone in a tube. A second weld head is then used to heat the material within the heat-affected zone to "a temperature higher than its tempering temperature but lower than its Ae1 temperature." U.S. Pat. No. 6,204,477 B1, issued to Lai also discloses a weld overlay method.

A need still exists, however, for a single pass weld overlay process which can provide uniform weld penetration on tube stock, uniform fusion of the overlay to the tube stock, smooth and even exterior surfaces on the overlay, and also, which can control the thickness of the overlay and, thus, the resulting dimensions of the tube once the overlay has been applied.

SUMMARY OF THE INVENTION

It is, therefore, the principal object of this invention to provide a method and apparatus for performing a weld overlay.

Another object of the present invention is to provide a weld overlay system using an alternating current (AC) gas metal arc-welding head for applying a weld overlay to a tube.

A still further object of the present invention is to provide a weld overlay system using an AC metal inert gas (MIG) welding process for applying a weld overlay to a tube.

Yet another object of the present invention is to provide a weld overlay system which results in reduced dilution of the base metal into the weld metal of the tube.

Another object of the present invention is to provide a weld overlay system for minimizing weld penetration into the tubing, for providing proper uniform fusion, and for providing a smooth and uniform exterior surface of a weld overlay.

Yet another object of the present invention is to provide a weld overlay system offering improved control of the thickness of overlay applied to a tube.

A further object of the present invention is to provide a method and apparatus for performing a single pass weld overlay using an AC pulsed gas metal arc (also known as metal inert gas (MIG)) welding process.

The present invention includes a process for applying a weld overlay to a tube with a single pass of a weld head. An inverter-type AC pulsed "MIG" power source, composed of a primary inverter and a secondary inverter, with good arc stability, is used to control the wire melting rate during welding of the overlay to the tube. The primary inverter controls the value of output current precisely, and the second inverter changes the polarity of output current between electrode negative (EN). For a fixed average welding current, the wire melting rate increases significantly as the electrode negative (EN) ratio increases, and this makes a relatively high welding speed attainable. Increasing the electrode negative (EN) ratio at a fixed, predetermined wire feed rate makes the weld penetration depth decrease. This correspondingly lowers the dilution, and, at the same time, the welding bead becomes narrow and smooth in appearance.

The AC power source unit is preferably of the type designed for relatively low-heat welding for items such as aluminum, sheet metal, etc. This provides a MIG weld overlay of lower dilution than is typical, and also a MIG weld with little to no splatter and less burn-in into the base metal.

A conventional direct current (DC) pulse gas metal arc welding process with same welding current value would generally produce weld overlay with much deeper weld penetration, unacceptably high dilution of the base metal into the weld metal, and uneven weld bead surfaces. Also, conventional DC gas metal arc welding processes are not generally suitable for weld overlay with deposition thickness less then 0.060 inches thick, whereas the AC MIG process of the present invention can produce weld overlay with a thickness range from 0.030 inches thick to 0.100 inches thick, with dilution rates of less than 20% and with weld beads of uniform and smooth appearance.

BRIEF DESCRIPTION OF THE DRAWINGS

The foregoing, as well as other objects of the present invention, will be further apparent from the following detailed description of the preferred embodiment of the invention, when taken together with the accompanying.

FIG. 1 is a schematic illustration of a weld overlay system constructed in accordance with the present invention, showing a welding head used to weld metal overlay on a metal tube;

FIG. 1A is a schematic view of a weld head applying a weld overlay in accordance with the present invention;

FIG. 2 is a schematic illustration of equipment used for performing weld overlay in accordance with the present invention; and FIG. 3 is a longitudinal sectional view of a tube with weld overlay applied in accordance with the present invention.

DESCRIPTION OF THE PREFERRED EMBODIMENT

The accompanying drawings and the description which follows set forth this invention in its preferred embodiment. However, it is contemplated that persons generally familiar with weld overlay procedures will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the weld overlay system of the present invention is indicated generally in the figures by reference character 10.

A preferred embodiment of a welding system of the present invention chosen for the purpose of the illustration is designated generally by reference number 10 in FIG. 1. Weld system 10 is shown in the process of applying weld metal overlay 11 to a metal boiler tube, generally T. A carbon and low alloy steel material is typical stock for tube T, and alloy 625 is suitable weld overlay material 11. However, the method and apparatus of the present invention are equally suitable for various other metal tube stock and weld overlay material, and it is to be understood that the present invention is not to be limited to the foregoing specific materials.

The weld overlay material 11 in the form of wire 11A is applied at a first location 12 on the tube T using an AC pulse inert gas "MIG" welding torch, generally 13, also known as gas metal arc welding torch. An AC inverter pulse MIG welding power supply, generally 13a, which can be of conventional design, provides power to the welding torch 13, shown in FIG. 1A, and a wire feeder 14 feeds metal overlay wire 11A to location 12 on the surface of tube T, as tube T is rotated. Suitable welding torch 13, wire feeder 14, and power supply 13a equipment for use with weld overlay system 10 of the present invention is manufactured by OTC Daihen, of Vandalia, Ohio, although it is to be understood that similar equipment from other manufacturers could also be used.

Inert gas 15 is directed against weld overlay location 12 to protect the weld puddle from impurities. The inert gas is preferably welding grade argon, with a flow rate of between 30 and 40 CFH (cubic feet per hour).

As shown in FIG. 2, welding head 13 is longitudinally advanced using a conventional welding robot, generally 22, mounted on a track 24, while the tube stock T is simultaneously rotated beneath the torch 13 in the direction indicated by the arrow 18 (FIG. 1).

As shown in FIG. 1, when viewed from the right end of tube stock T, tube T rotates in a clockwise direction, and weld head 13 is preferably positioned 30 to 45 degrees from horizontal near the top of the tube stock T. While using the AC mode of the inverter power source 13a, output electrode negative (EN), and with pulsing of the weld current, the tube stock overlay 11 can be produced with dilution of less than 20% in a thickness range of 0.030 inches to 0.100 inches thick.

During operation, weld head 13 oscillates in directions generally parallel to the longitudinal axis of tube stock T. To control the temperature of the tube stock T and to control the rate of cooling of the weld overlay metal 11, water flows through water feed 32 into the tube stock T during the welding process, as shown in the FIG. 2.

As also shown in FIG. 2, welding robot 22 is mounted on track 24, and moves along the length of the tube stock T while applying the overlay to tube stock T in a single pass.

In a preferred embodiment, one end of the tube stock is gripped in a chuck 30, which is rotatably driven by an electric motor unit, generally, 36, or other suitable means. Each end of the tube stock is capped by rotary unions of conventional design (not shown) with hoses, generally 40, coupled to the rotary unions, which introduce water into one end of the tube stock and withdraw the water from the other end.

Welding robot 22 includes an arm to which a suitable mounting bracket 42 is attached to hold welding head 13, preferably at angle 30 to 45 degrees from horizontal near the top of tube stock T.

As the welding robot 22 moves along the longitudinal axis of the tube stock, the tube stock rotates underneath the welding robot arm. Simultaneously, the weld pool is mechanically oscillated by the welding robot head in the longitudinal axis of the tube stock to provide a smooth surface finish.

The speed at which the robot 22 moves along the axis of the tube stock is controlled with respect to the speed at which the tube stock T is rotated, so that the weld head 13 is advanced by a distance equal to the width of the weld bead for each rotation of the tube.

To support the weight of the tube stock along its length, metal roller supports 44 are provided and are positioned along the length of the tube stock T.

At the initiation of the weld overlay process, the robot 22 preferably starts at the chuck end of the tube stock T and moves on the track 24 along the axis of the tube stock T until the desired length of weld overlay is completed. The position and movements of the welding robot 22 are controlled through control panels, pendants, or other operator interfaces, and specific welding parameters are preferably controlled through robot software interfaces.

FIG. 3 is a longitudinal sectional view of a tube with weld overlay, illustrating three primary zones in an overlaid pipe: the weld, generally 48; the heat-affected zone, generally 50; and the unaffected base metal, generally 52. The boundary between the weld 48 and the heat-affected zone 52 is also known as the fusion boundary 54.

EXAMPLE

In one example of application of the present invention, tube stock T two inches in diameter (2.00" O.D.) of SA-213-T 22 material was weld—overlaid using an AC pulse "MIG". The tube stock was rotated at seven rotations per minute. Cooling water with temperature of 80 to 110 degrees F. flowed through the tube at rate of seven to twelve gallons per minute. Overlay material alloy 625 in the form of weld wire, with diameter of 0.045 inches, was mechanically fed at a rate of 350 inches per minute, at a voltage of 6 to 8 volts and at a current of 200 amperes. The weld pool was shielded during welding by welding grade argon at 35 to 45 cubic feet per hour (CFH). The welding torch 13 was positioned at a head angle of 35 to 45 degrees. A resulting weld overlay with a deposit thickness of 0.070 inches, having a generally smooth surface finish, was deposited on the outer surface of the tube stock.

From the foregoing it can be seen that the present invention provides an improved weld overlay system using a pulsed AC MIG power supply device capable of delivering improved weld overlay characteristics.

While preferred embodiments of the invention have been described using specific terms, such description is for present illustrative purposes only, and is to be understood that changes and variations to such embodiments, including but not limited to the substitution of equivalent features or parts, and the reversal of various features or parts, and the reversal of various features thereof, may be practiced by those of ordinary skill in the art without departing from the spirit or scope of the following claims.

What is claimed is:

1. A process for applying a weld overlay to a tube, comprising:
   providing an output current using an alternating current pulse power source having a first inverter and a second inverter;
   providing an alternating current pulse inert gas welding head and supplying said output current thereto;
   supplying overlay material to the tube at a predetermined rate;
   using said first inverter to pulse said output current supplied to said alternating current pulse inert gas welding head while simultaneously controlling the electrode negative ratio of said output current using said second inverter, and while using a single pass of said alternating current pulse inert gas welding head, simultaneously applying said overlay material onto the tube at a thickness greater than 0.030 inches and with less than 20% dilution into the overlay material;
   rotating the tube relative to said alternating current pulse inert gas welding head during said applying of said overlay material to the tube;
   selectively increasing the rate at which said overlay material is applied to the tube by selectively increasing said electrode negative ratio;
   forming a weld pool on the tube where said overlay material is applied to the cube; and
   oscillating said weld pool as said overlay material is applied to the tube.

2. A process for applying a weld overlay to a tube, comprising:
   providing an output current using an alternating current pulse power source having a first inverter and a second inverter;
   providing an alternating current pulse inert gas welding head and supplying said output current thereto;
   a providing a robot connected to said alternating current pulse inert gas welding head;
   supplying overlay material to the tube at a predetermined rates;
   using said first inverter to pulse said output current supplied to said alternating current pulse inert gas welding head while simultaneously controlling the electrode negative ratio of said output current using said second inverter, and while using a single pass of said alternating current pulse inert gas welding head, simultaneously applying said overlay material onto the tube at a thickness greater than 0.030 inches and with less than 20% dilution into the overlay material;
   moving said robot along substantially the length of the tube as the overlay material is applied to the tube;
   rotating the tube relative to said alternating current pulse inert gas welding head during said applying of said overlay material to the tube;
   shielding said overlay material with an inert gas at the rate of between thirty-five and forty-five cubic feet per hour as said overlay material is applied to the tube;
   selectively increasing the rate at which said overlay material is applied to the tube by selectively increasing said electrode negative ratio;
   forming a weld pool on the cube where said overlay material is applied to the tube; and
   oscillating said weld pool as said overlay material is applied to the tube.

3. A process for applying a weld overlay to a tube, comprising:
   providing an output current using an alternating current pulse power source;
   providing a gas metal arc welding head and supplying said output current thereto;
   supplying overlay material to the tube at a predetermined rate; and
   using said alternating current pulse power source to pulse said output current supplied to said gas metal arc welding head while controlling the electrode negative ratio of said output current, and while simultaneously applying said overlay material onto the tube using said gas metal arc welding head at a thickness greater than 0.030 inches and with less than 20% dilution into the overlay material.

4. The process as defined in claim 3, further comprising performing said step of applying of said overlay material to the cube using a robot connected to said gas metal arc welding head, and further comprising moving said robot along substantially the length of the tube as the overlay material is applied to the tube.

5. The process as defined in claim 3, further comprising performing said step of applying of said overlay material to the tube using a robot connected to said gas metal arc welding head, and further comprising moving said robot on a track along substantially the length of the tube as the overlay material is applied to the tube.

6. The process as defined in claim 3, further comprising selectively increasing the rate at which said overlay material is applied to the tube by selectively increasing said electrode negative ratio.

7. The process as defined in claim 3, further comprising performing said step of applying said overlay material to the tube using said gas metal arc welding head angled between thirty and forty-five degrees with respect to the tube.

8. The process as defined in claim 3, further comprising performing said step of applying said overlay material to the tube during a single pass of said weld head with respect to the tube.

9. The process as defined in claim 3, further comprising performing said step of applying of said overlay material to the tube using said gas metal arc welding head at a voltage of between six and eight volts.

10. The process as defined in claim 3, further comprising performing said step of applying of said overlay material to the tube using said gas metal arc welding head operating at an amperage of approximately 200 amperes.

11. The process as defined in claim 3, further comprising performing said step of applying of said overlay material to the tube while supplying said overlay material at the rate of approximately 350 inches per minute.

12. The process as defined in claim 3, further comprising shielding said overlay material with an inert gas at the rate of between thirty-five and forty-five cubic feet per hour as said overlay material is applied to the tube.

13. The process as defined in claim 3, further comprising shielding said overlay material with Argon delivered at the rate of between thirty-five and forty-five cubic feet per hour as said overlay material is applied so the tube.

14. The process as defined in claim 3, further comprising rotating the tube relative to said gas metal arc welding head during said applying of said overlay material to the tube.

15. The process as defined in claim 3, further comprising rotating the tube relative to said gas metal arc welding head at approximately 7 r.p.m. during said applying of said overlay material to the tube.

16. The process as defined in claim 3, wherein said overlay material is applied to the tube at an overlay thickness of approximately 0.070 inches.

17. The process as defined in claim 3, further comprising forming a weld pool on the tube where said overlay material is applied to the tube and oscillating said weld pool as said overlay material is applied to the tube.

18. The process as defined in claim 3, further comprising forming a weld pool on the tube where said overlay material is applied to the tube and oscillating said weld pool in a direction generally parallel to the length of the tube as said overlay material is applied to the tube.

19. A system for applying overlay material to a tube to form a weld overlay on the tube, the system comprising:
  a gas metal arc welding head;
  an alternating current pulse power source providing an output current to said gas metal arc welding head;
  said gas metal arc welding head being configured for applying the overlay material to the tube in a single pass with respect to the tube;
  said alternating current pulse power source being configured to pulse said output current supplied to said gas metal arc welding head while controlling the electrode negative ratio of said output current;
  said alternating current pulse power source including an inverter configured for selectively increasing the rates at which said overlay material is applied to the rube by selectively increasing said electrode negative ratio such that the overlay material applied to the tube by said gas metal arc welding head has less than 20% dilution into the overlay material;
  a robot connected to said gas metal arc welding head;
  a track extending substantially the length or the tube;
  means for moving said robot on said track substantially the length of the tube; and
  means for rotating the tube relative to said gas metal arc welding head during application of said overlay material to the tube by said gas metal arc welding head.

* * * * *